F. M. LOCKE.

DIE FOR FORMING INSULATORS.

APPLICATION FILED FEB. 20, 1907.

Reissued Apr. 6, 1909.

12,934.

Witnesses.
A. C. Thomas
C. E. Chase

Inventor.
Fred M. Locke
By.
Howard P. Denison
Attorney.

UNITED STATES PATENT OFFICE.

FRED M. LOCKE, OF VICTOR, NEW YORK.

DIE FOR FORMING INSULATORS.

No. 12,934. Specification of Reissued Letters Patent. Reissued April 6, 1909.

Original No. 838,727, dated December 18, 1906, Serial No. 288,975. Application for reissue filed February 20, 1907. Serial No. 358,400½.

*To all whom it may concern:*

Be it known that I, FRED MORTON LOCKE, a citizen of the United States of America, residing at Victor, in the county of Ontario and State of New York, have invented certain new and useful Improvements in Dies for Forming Insulators, of which the following is a specification, reference being had to the accompanying drawings.

This invention relates to certain improvements in dies for forming the interior contours of hollow plastic bodies and refers more particularly to the means for forming the interior chambers and petticoats of insulators as an improvement upon my Patent No. 716,343, December 16, 1902, in which one of the essential purposes is to provide for the escape and reëntrance of air through the die during its entrance into or withdrawal from the plastic material. In this class of apparatus, a die is uniformly and progressively advanced under a rotary motion into and out of the plastic material, in a suitable mold which forms the exterior of the insulator and in my patent referred to, I have provided the die with a series of apertures for the escape and a valved inlet for the reëntrance of air from and to the intervening space between the die and the plastic body, but in my present invention, I have sought to simplify and at the same time increase the efficiency of the die by providing it with an annular air space opening centrally from the bottom of the deepest chamber in the die to atmosphere so that the escape and reëntrance of air will be uniformly distributed over practically the entire area or surface of the plastic material which is being formed.

In other words, my object is to cause the air to follow more closely along the sides of the forming surface or chambers of the die between such surface and the material into which the die enters, whereby the air finds a more direct escape to prevent air holes and also allows such air to enter more directly between the die and plastic material for the purpose of freeing the die from any adhering matter as said die is withdrawn therefrom.

Figure 1:
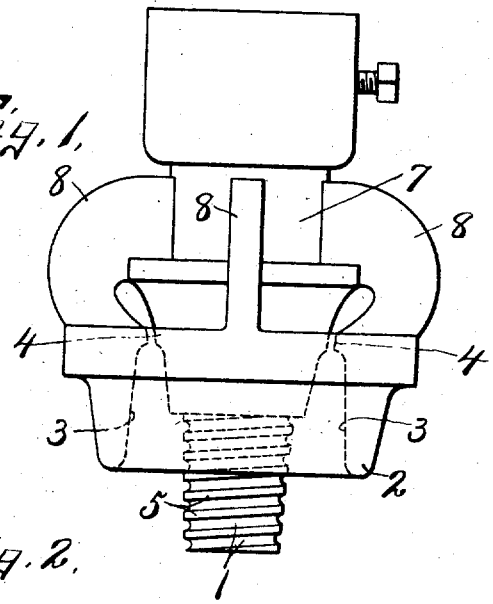
Figure 2:
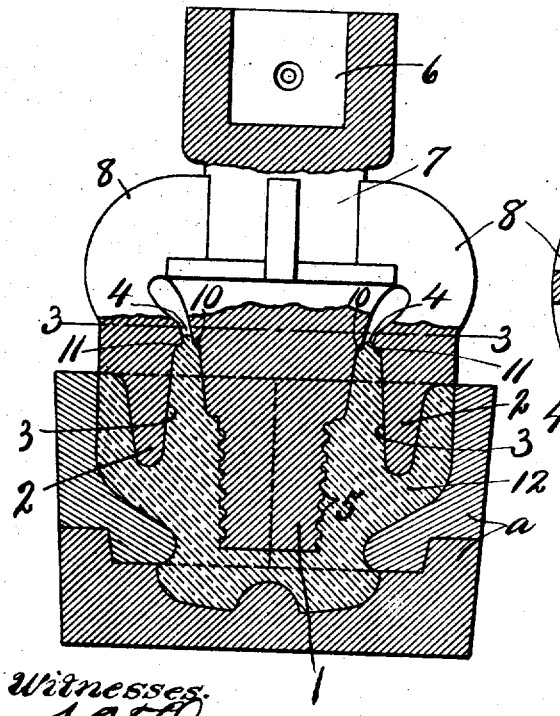
Figure 3:
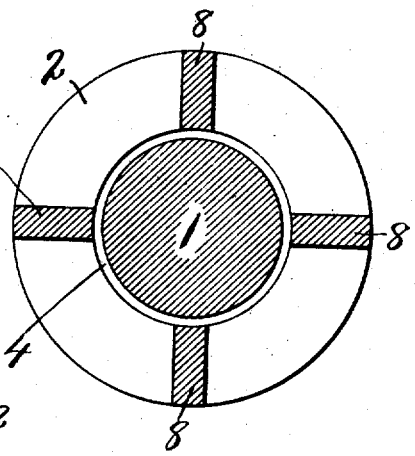

Other objects and uses will be brought out in the following description:

In the drawings—Figure 1 is an elevation of my improved die. Fig. 2 is a longitudinal vertical sectional view partly in elevation of the die seen in Fig. 1 and also the mold and insulator formed therein. Fig. 3 is a horizontal section taken on line 3—3, Fig. 2, showing the central stem and concentric flange which surrounds the same.

As seen in the drawings, this die consists essentially of the central screw threaded stem —1— and a concentric flange —2— surrounding the central stem but spaced apart therefrom forming the intervening annular chamber —3— which forms one of the petticoats or flanges of the insulator and terminates at its base in a constricted annular channel or air passage —4— opening from the center of the base of the chamber —3— to atmosphere.

The central stem —1— is extended in opposite directions some distance beyond the opposite ends of the chamber —3— and flange —2— the end opposite to that upon which the threads as —5— are formed, being provided with a socket —6— adapted to receive any suitable shaft or rotating member by which rotary axial motion may be imparted to the die in the manner set forth in my patent previously referred to or in any other suitable manner not necessary to herein illustrate or describe. The flange —2— is united to the extension as —7— of the stem —1— above the annular air passage —4— by two or more radial arms —8— thereby leaving a clear open space above the flange —2— and annular space —4— for communication with the chamber —3— through said annular space —4—. This annular space —4— is narrower than the adjacent transverse width of the annular chamber —3— leaving inner and outer annular shoulders —10— and —11— at opposite sides of the air passage —4— to give the desired form to the edge of the petticoat of an insulator —12—, said air space —4— leaving a thin annular fin on the edge of said petticoat which fin may be thrown off through the air passage —4— or may be subsequently trimmed off by hand. It is now obvious that if this die is advanced progressively and uniformly under a rotary motion into a body of plastic material which is retained in a suitable mold —*a*—, the threaded stem —1— will form a central threaded socket, while the flange —2— will form an annular chamber in said plastic material, leaving a petticoat of the same material formed by the walls of the chamber —3— and the mold —*a*— will form the exterior of the insulator, during which operation, the air between the contiguous faces of the die and plastic body will be forced upwardly and find free exit through the annular passage —4— to atmosphere. On the other hand, when the die is uniformly and progressively withdrawn under a reverse rotary motion from the plastic material, the air will readily enter through the annular passage —4— and follow along the contiguous surface of the die and plastic material, thereby relieving any tendency to create a vacuum which would operate to destroy symmetry and smoothness of the contour of the plastic material previously formed. In other words, by creating a narrow annular air space at the base of the chamber —3—, air is allowed to escape and reënter at all points in the circumference of the central stem —1— and inner circumference of the flange —2— thereby assuring an even distribution of the air and a direct exit and reëntrance at the base of the chamber —3— which is the last to fill up with and is the first to recede from the plastic material during the formation of the insulator or other article.

What I claim is:

1. In a die for forming interior contours of plastic bodies, a central stem and an annular flange surrounding said stem but spaced apart therefrom forming an annular chamber between the stem and flange, said chamber being constricted at its base forming an annular passage opening to the atmosphere.

2. In a die for chambering insulators, a threaded stem and an annular flange surrounding the same but spaced apart therefrom forming an intervening annular space terminating at its base in a constricted annular air passage opening to the atmosphere.

3. In a die for chambering insulators, a threaded stem and an annular flange surrounding the same and spaced apart therefrom, forming an intervening annular space terminating at its base in a constricted annular passage surrounding the base of the stem and opening to the atmosphere, said stem extending in opposite directions beyond the ends of the flange and arms uniting said flange to one of the extensions of the stem.

4. A mold for plastic material embodying two coöperating members between which the plastic material is pressed, one of said members having an annular recess for forming a flange on the molded article and a narrow annular passage at the bottom of said recess for permitting the passage of air.

5. A mold for forming insulators from plastic materials embodying two coöperating members between which the material is pressed, one of said members having the annular recess for forming a petticoat on the insulator and a narrow annular passage at the extreme bottom of said recess for permitting the exit of air and an exceedingly narrow film of the material being molded, and the other mold member forming the exterior of the insulator.

6. A mold for forming insulators from plastic material embodying a member by which the material is pressed, said member having an annular shoulder thereon and having an outer annular section provided with a shoulder thereon corresponding to the first mentioned shoulder to mold the edge of an insulator-petticoat and a narrow annular channel between said shoulders through which the air and a film of plastic material narrower than the petticoat may escape.

7. In a mold for plastic material, a stock having a threaded terminal, an annular member surrounding said stock intermediate its ends and spaced slightly therefrom and with an integral annular rib depending from said annular member and spaced from the threaded portion of said stock, and a plurality of braces integral with said stock and annular member and connecting the annular member to the stock.

8. In a mold for plastic material, a stock having a socket at one end and threaded for a portion of its length at the other end, an annular member surrounding said stock intermediate its ends and spaced slightly therefrom and with an integral depending annular rib spaced from said stock, and a plurality of braces spaced apart and connecting said stock and annular member and integral with the same.

In witness whereof I have hereunto set my hand this 7th day of February, 1907.

FRED M. LOCKE.

Witnesses:
CHAS. S. BELL,
W. W. HIBBARD.